United States Patent
Nakayama (10) Patent No.: US 10,168,671 B2
(45) Date of Patent: Jan. 1, 2019

(54) ENERGY MANAGEMENT SYSTEM, ENERGY MANAGEMENT APPARATUS, TERMINAL, AND ENERGY MANAGEMENT METHOD (71) Applicant: KYOCERA Corporation, Kyoto-shi, Kyoto (JP)

(72) Inventor: Taku Nakayama, Yamato (JP)

(73) Assignee: KYOCERA Corporation, Kyoto (JP)

( * ) Notice: Subject to any disclaimer, the term of this patent is extended or adjusted under 35 U.S.C. 154(b) by 157 days.

(21) Appl. No.: 15/107,891

(22) PCT Filed: Dec. 24, 2014

(86) PCT No.: PCT/JP2014/084196
§ 371 (c)(1),
(2) Date: Jun. 23, 2016

(87) PCT Pub. No.: WO2015/098987
PCT Pub. Date: Jul. 2, 2015

(65) Prior Publication Data
US 2016/0334763 A1 Nov. 17, 2016

(30) Foreign Application Priority Data

Dec. 24, 2013 (JP) ................. 2013-266173

(51) Int. Cl.
G05B 13/02 (2006.01)
G06Q 50/16 (2012.01)
H02J 3/14 (2006.01)
G06Q 50/06 (2012.01)
H02J 13/00 (2006.01)
G05B 11/01 (2006.01)

(52) U.S. Cl.
CPC .......... *G05B 13/026* (2013.01); *G05B 11/01* (2013.01); *G05B 13/021* (2013.01); *G06Q 50/06* (2013.01);
(Continued)

(58) Field of Classification Search
CPC ..... G05B 13/026; G05B 13/021; G05B 11/01
See application file for complete search history.

(56) References Cited

U.S. PATENT DOCUMENTS 8,406,933 B2* 3/2013 Nagel ............... H04L 67/125
700/286
2010/0174935 A1* 7/2010 Kim ................... G03G 15/5004
713/324
(Continued)

FOREIGN PATENT DOCUMENTS

JP 2005-261050 A 9/2005
JP 2009-091132 A 4/2009
(Continued)

OTHER PUBLICATIONS

International Search Report and Written Opinion of the International Searching Authority issued by the Japanese Patent Office for International Application No. PCT/JP2014/084196.

Primary Examiner — Vincent H Tran
(74) Attorney, Agent, or Firm — Procopio Cory Hargreaves and Savitch LLP (57) ABSTRACT An energy management system manages energy consumption of equipment. The energy management system comprises: a controller configured to execute automatic control of the equipment in accordance with a target value used for managing the equipment. The controller outputs, in response to an operation for cancelling the automatic control, effect information which is information regarding an effect obtained by the automatic control.

17 Claims, 5 Drawing Sheets (52) U.S. Cl.
CPC .............. *G06Q 50/16* (2013.01); *H02J 3/14*
(2013.01); *H02J 13/001* (2013.01); ***H02J
13/0062* (2013.01); *H02J 13/0075*** (2013.01);
*Y02B 70/3225* (2013.01); *Y04S 20/222*
(2013.01)

(56) References Cited

U.S. PATENT DOCUMENTS

| | | | | |
|---|---|---|---|---|
| 2011/0213996 | A1* | 9/2011 | Imine | G06F 1/3203 |
| | | | | 713/323 |
| 2012/0144219 | A1* | 6/2012 | Salahshour | G06F 1/3203 |
| | | | | 713/322 |
| 2012/0323390 | A1 | 12/2012 | Kobayashi | |
| 2013/0082526 | A1* | 4/2013 | Lee | H02J 3/14 |
| | | | | 307/31 |
| 2013/0083193 | A1* | 4/2013 | Okuyama | H04L 12/12 |
| | | | | 348/143 |
| 2014/0040458 | A1* | 2/2014 | Ahn | G06F 11/3058 |
| | | | | 709/224 |

FOREIGN PATENT DOCUMENTS

| | | |
|---|---|---|
| JP | 2011-166884 A | 8/2011 |
| JP | 2012-133553 A | 7/2012 |
| JP | 2013-174418 A | 9/2013 |
| JP | 2013-229995 A | 11/2013 |

\* cited by examiner

ENERGY MANAGEMENT SYSTEM, ENERGY MANAGEMENT APPARATUS, TERMINAL, AND ENERGY MANAGEMENT METHOD

TECHNICAL FIELD

The present invention relates to an energy management system, an energy management apparatus, a terminal, and an energy management method that manage energy consumption of equipment.

BACKGROUND ART

In recent years, energy management systems (EMS) that manage energy consumption of equipment have attracted public attention. Examples of such energy management systems include a home energy management system (HEMS), a building energy management system (BEMS), a factory energy management system (FEMS), and a store energy management system (SEMS).

The energy management systems perform visualization, control, and the like, of energy consumption of individual equipment. For example, the energy management systems instruct reduction of energy consumption of individual equipment when the total energy consumption of the equipment exceeds a predetermined threshold value (e.g., see Patent Literature 1).

The energy management systems described above instruct reduction of energy consumption of the individual equipment when the total energy consumption of the individual equipment exceeds a predetermined threshold value (which will be referred to as automatic control hereinafter). Specifically, the automatic control forcibly changes control states of the equipment set by users. The automatic control is an effective control way to save energy, but not favorable for users in view of the quality of life (QoL). Thus, the automatic control has a trade-off relationship between the energy saving and the QoL.

Under such a background, users might cancel the automatic control to improve the QoL, but may fail to obtain sufficient energy-saving effects if the automatic control is limitlessly cancelled.

CITATION LIST

Patent Literature

Patent Literature 1: Japanese application publication No. 2005-261050.

SUMMARY OF INVENTION

A first aspect is abstracted as an energy management system that manages energy consumption of equipment, comprising: a controller configured to execute automatic control of the equipment in accordance with a target value used for managing the equipment, wherein the controller outputs, in response to an operation for cancelling the automatic control, effect information which is information regarding an effect obtained by the automatic control.

In the first aspect, the controller outputs the effect information by associating the effect information with a list of target equipments to be automatically controlled in the automatic control.

In the first aspect, the effect information is information regarding an effect predicted to be obtained when the automatic control is not cancelled.

In the first aspect, the automatic control includes a plurality of automatic control modes according to a reduction amount of energy consumption, and the effect information includes a plurality of effects obtained by each of the automatic control modes.

In the first aspect, the controller outputs pop-up information for urging reconfirmation of cancellation of the automatic control in response to the operation for cancelling the automatic control.

In the first aspect, the controller outputs the pop-up information by including the effect information in the pop-up information.

In the first aspect, the controller outputs the effect information in an amount of money.

A second aspect is abstracted as an energy management apparatus for managing energy consumption of equipment, comprising: a controller configured to execute automatic control of the equipment in accordance with a target value used for managing the equipment, wherein the controller outputs, in response to an operation for cancelling the automatic control, effect information which is information regarding an effect obtained by the automatic control.

A third aspect is abstracted as a terminal used in an energy management system for executing automatic control of equipment in accordance with a target value used in managing the equipment, the terminal comprising: an output unit configured to output, in response to an operation for cancelling the automatic control, effect information which is information regarding an effect obtained by the automatic control.

A fourth aspect is abstracted as an energy management method for managing energy consumption of equipment, comprising: executing automatic control of the equipment in accordance with a target value used for managing the equipment; and outputting, in response to an operation for cancelling the automatic control, effect information which is information regarding an effect obtained by the automatic control.

DESCRIPTION OF EMBODIMENTS

Hereinafter, the energy management system according to the embodiment will be described. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

Overview of Embodiments

An energy management system according to embodiments manages energy consumption of equipment. The energy management system comprises: a controller configured to execute automatic control of the equipment in accordance with a target value used for managing the equipment. The controller outputs, in response to an operation for cancelling the automatic control, effect information which is information regarding an effect obtained by the automatic control.

In the embodiments, the controller outputs, in response to an operation for cancelling the automatic control, effect information which is information regarding an effect obtained by the automatic control. The user is allowed to cancel the automatic control, while motivation of the user to desire cancellation of the automatic control can be suppressed by seeing the effects to be obtained for reference. As a result of this, the energy saving and the QoL can both be achieved effectively.

First Embodiment (Energy Management System)

Figure 1:
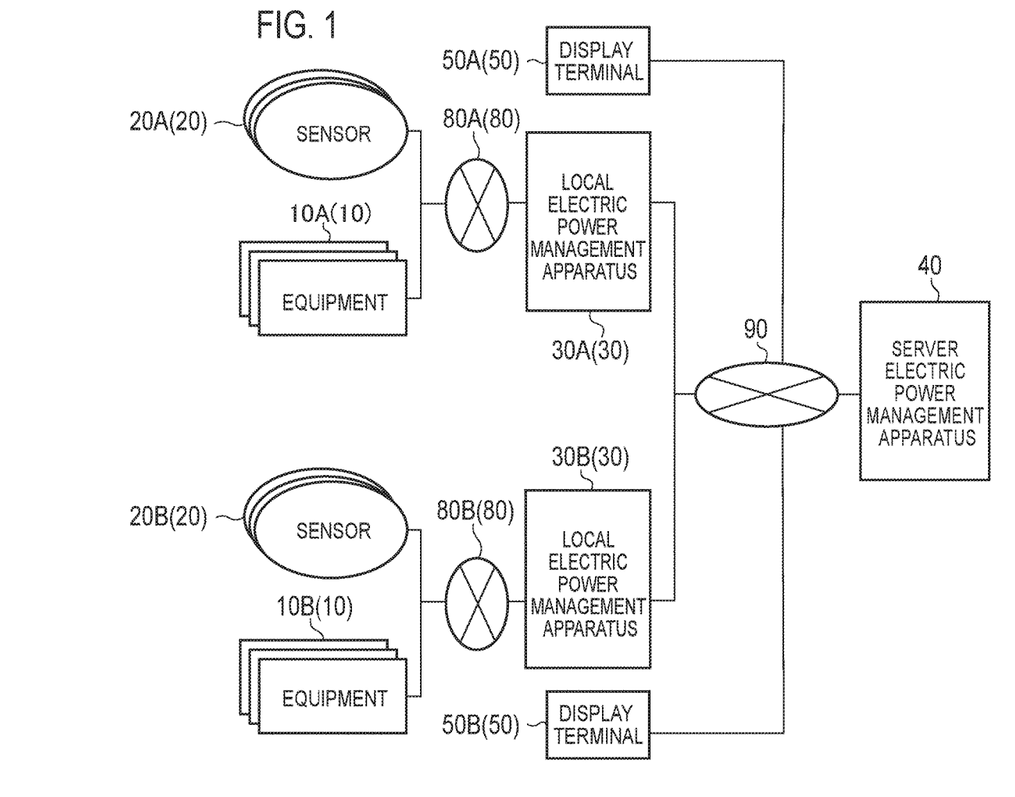
FIG. 1 illustrates an electric power management system 100 according to a first embodiment.

An energy management system according to a first embodiment will be described below. FIG. 1 illustrates an electric power management system 100 according to a first embodiment.

As illustrated in FIG. 1, the electric power management system 100 includes multiple pieces of equipment 10, sensors 20, local electric power management apparatuses 30, a server electric power management apparatus 40, and display terminals 50.

The first embodiment mainly illustrates a system for managing electric power as an example of the energy management systems. The embodiment, however, is not limited to this, and the electric power management system 100 may also manage other energy than electric power (e.g., gas). The words "electric power", as used herein, may be replaced by "energy".

The equipment 10 consumes energy such as electric power or gas. Examples of the equipment 10 include air conditioners, lighting apparatuses, and cooling cases. For example, equipment 10A is installed in a facility A and equipment 10B is installed in a facility B. The facilities A and B are run, for example, by the same group of companies funded by the same financial group.

In the first embodiment, the equipment 10 may include a piece of equipment 10, which can be controlled automatically as described later, and another piece of equipment 10, which is uncontrollable by the automatic control.

The sensors 20 detect information necessary for management of the equipment 10. The sensors 20 may be electric sensors, for example, that detect power consumption of the equipment 10. When the equipment 10 includes air conditioners, the sensors 20 function as temperature sensors that detect external temperatures or humidity sensors that detect external humidity of space (area) or facilities in which such air conditioners are installed. When the equipment 10 include lighting apparatuses, the sensors 20 function as illuminance sensors that detect illuminance of space (area) in which such lighting apparatuses are installed. When the equipment 10 includes cooling cases, the sensors 20 function as temperature sensors that detect temperatures in the cooling cases. The sensors 20A may be installed in the facility A, and the sensors 20B may be installed in the facility B.

The local electric power management apparatuses 30 manage the equipment 10 connected therewith via LAN 80. Specifically, the local electric power management apparatuses 30 are connected to the equipment 10 and the sensors 20 via the LAN 80, and manage the power consumption of the equipment 10 in accordance with the information detected by the sensors 20. For example, a local electric power management apparatus 30A may be installed in the facility A to manage the equipment 10A connected via the LAN 80A. A local electric power management apparatus 30B may be installed in the facility B to manage the equipment 10B connected via the LAN 80B.

In the first embodiment, the local electric power management apparatuses 30 individually control the operation mode of each piece of equipment 10 in accordance with a control signal received from the server electric power management apparatus 40.

The server electric power management apparatus 40 is connected to each of the local electric power management apparatuses 30 via a WAN 90 and manages the power consumption of the equipment 10 via each of the local electric power management apparatuses 30. Specifically, the server electric power management apparatus 40 executes automatic control of the equipment 10 in accordance with a target value used in managing the equipment 10.

The automatic control of the equipment 10 is a process to control an accumulated value of the power consumption of each facility for a predetermined time period (e.g., 30 minutes) so as not to exceed a predetermined threshold value (target value). The server electric power management apparatus 40 may output an alert if it is predicted that the accumulated value of the power consumption exceeds the predetermined threshold value.

Alternatively, the automatic control of the equipment 10 may also be a process to automatically control the power consumption of the equipment 10 to prevent the sum of the power consumption from exceeding the predetermined threshold value (target value). The server electric power management apparatus 40 may output an alert, if it is predicted that the sum of the power consumption exceeds the predetermined threshold value.

The display terminals 50 are terminals operated by users, such as tablet terminals or personal computers. Each display terminal 50 receives an operation (user operation) to cancel the automatic control. For example, the display terminal 50 displays an image to change automatic control settings in accordance with the operation to cancel the automatic control. The display terminals 50 may display the alert output from the server electric power management apparatuses 40.

FIG. 1 includes a display terminal 50A disposed as the display terminal 50 near the local electric power management apparatus 30A and a display terminal 50B disposed near the local electric power management apparatus 30B. The display terminals 50A and 50B may be moved to different locations away from the local electric power management apparatuses 30A and 30B.

(Energy Management Apparatus)

Figure 2:
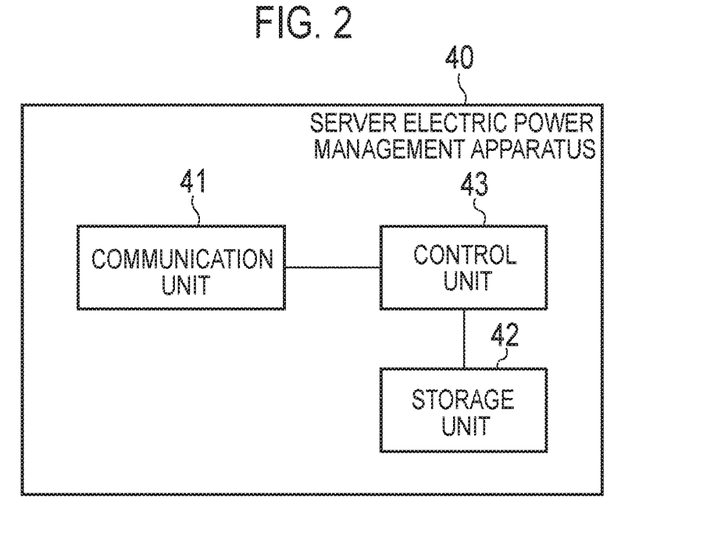
FIG. 2 illustrates a server electric power management apparatus 40 according to the first embodiment.

An energy management apparatus according to the first embodiment is described below. FIG. 2 illustrates the server electric power management apparatus 40 according to the first embodiment. The server electric power management apparatus 40 of the first embodiment is an example of the energy management apparatus.

As illustrated in FIG. 2, the server electric power management apparatus 40 includes a communication unit 41, a storage unit 42, and control unit 43.

The communication unit 41 is a communication module for communication via the WAN 90. The communication unit 41 receives information, which represent an operation state of the equipment 10 and information detected by the sensors 20, from the local electric power management apparatus 30. The communication unit 41 transmits a control signal to control the operation of the equipment 10 to the local electric power management apparatus 30.

In the first embodiment, the communication unit 41 transmits effect information, which indicates the effect obtained by the automatic control, to the display terminal 50, when an operation to cancel the automatic control is performed. The communication unit 41 may also transmit an alert message, which informs that the power consumption of the equipment 10 may exceed the predetermined threshold value (target value), to the display terminal 50.

The storage unit 42 stores information received from the local electric power management apparatus 30. For example, the storage unit 42 cumulatively stores the power consumption of the equipment 10. The storage unit 42 may store the operation state of the equipment 10 by correlating the operation state with the information (e.g., power consumption of the equipment 10) detected by the sensor 20.

The control unit 43 manages the server electric power management apparatus 40. For example, the control unit 43 executes automatic control of the equipment 10 in accordance with the target value used in managing the equipment 10. Specifically, the control unit 43 first extracts automatically controllable equipment 10 according to the order of priority, if the power consumption of the equipment 10 is determined (predicted) to exceed the predetermined threshold value (target value). Secondly, the control unit 43 chooses the equipment 10 one by one in the order of higher priority, and determines (predicts) whether the power consumption of the equipment 10 is smaller than the predetermined threshold value (target value) when the automatic control is executed to the chosen equipment 10. Thirdly, the control unit 43 continues to choose the equipment 10, which should be subjected to the automatic control, until the power consumption of the equipment 10 is determined to be smaller than the predetermined threshold value (target value). Fourthly, the control unit 43 executes the automatic control on the equipment 10 that has been chosen as the equipment 10 to be subjected to the automatic control. This prevents the power consumption of the equipment 10 from exceeding the predetermined threshold value (target value).

In the first embodiment, cancellation of the automatic control by users is allowed. Under this premise, the control unit 43 outputs effect information, which indicates the effect to be obtained from the automatic control, in response to the operation of cancelling the automatic control. The effect information indicating the effect obtained from the automatic control is transmitted from the communication unit 41 to the display terminal 50, as mentioned above.

The effect information is preferably the information regarding a predicted effect to be obtained so long as the automatic control is not cancelled. In other words, the effect information may be the amount of loss to be generated due to the cancellation of the automatic control. The amount of loss may be calculated in the unit of a year. However, the embodiment is not limited to this. For example, the effect information may indicate the reduction of electric power achieved by the automatic control, or may be any kind of indices.

The control unit 43 may output the effect information indicating the effect obtained from the automatic control by correlating the effect with a list of target equipment to be controlled automatically.

When several automatic control modes are defined in the automatic control according to the reduction of the energy consumption, the effect information may include effects obtained by each of the automatic control modes.

The control unit 43 may output the effect information indicating the effects obtained by the automatic control in a manner that the equipment 10 is displayed in the order of larger effects to be obtained by the automatic control in a case where multiple pieces of equipment 10 are provided as the target equipment to be controlled automatically in the automatic control. Alternatively, the control unit 43 may output the effect information indicating the effects obtained by the automatic control in a manner that the equipment 10 is displayed in the order of smaller effects to be obtained by the automatic control in a case where multiple pieces of equipment 10 are provided as the target equipment to be controlled automatically in the automatic control.

(Display Terminal)

Figure 3:
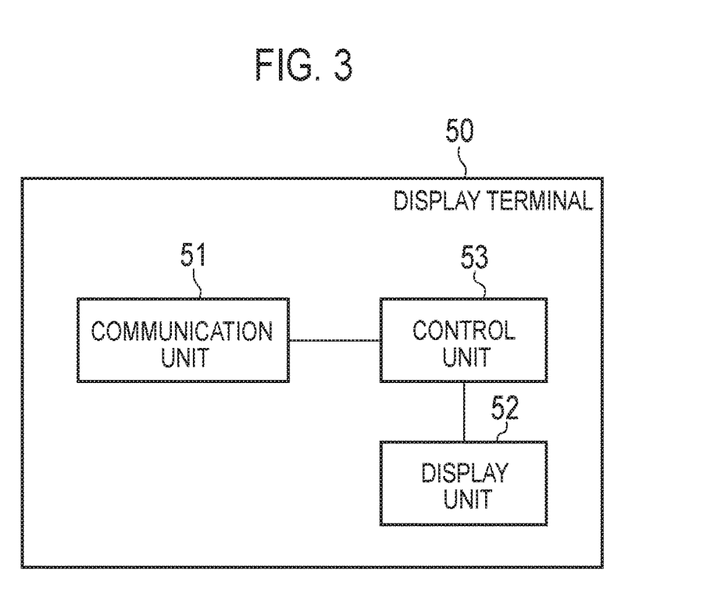
FIG. 3 illustrates a display terminal 50 according to the first embodiment.

A display terminal according to the first embodiment is described below. FIG. 3 illustrates a display terminal 50 according to the first embodiment.

As illustrated in FIG. 3, the display terminal 50 includes a communication unit 51, a display unit 52, and a control unit 53.

The communication unit 51 is a communication module that performs communication via the WAN 90. The communication unit 51 receives the effect information indicating the effects obtained by the automatic control from the server electric power management apparatus 40. The communication unit 51 may also receive an alert message informing that the power consumption of the equipment 10 may exceed the predetermined threshold value (target value).

The display unit 52 forms an output unit to output the effect information indicating the effects obtained by the automatic control. Specifically, the display unit 52 displays an image for changing settings of the automatic control in response to accepting an operation (user operation) to cancel the automatic control. The display unit 52 displays the effect information indicating the effects obtained by the automatic control in the image for changing the settings of the automatic control.

Figure 4:
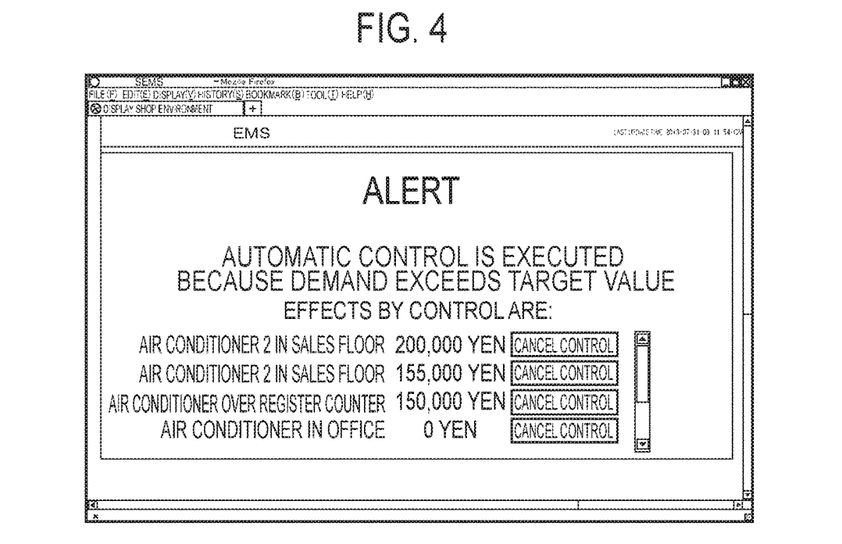
FIG. 4 illustrates an example image displayed on the display terminal 50 according to the first embodiment.

The effect information indicates, for example, the information regarding predicted effects to be obtained so long as the automatic control is not cancelled. In other words, the effect information is the amount of loss to be generated due to cancellation of the automatic control. In this case, the display unit 52 displays the amount of loss to be generated due to the cancellation of the automatic control on the image for changing the automatic control settings, as illustrated in FIG. 4, by relating the amount of loss to a list of target equipment to be automatically controlled in the automatic control. It is noted herein that the amount of loss to be generated due to the cancellation of the automatic control is equivalent to the amount of money benefited from the automatic control.

FIG. 4 illustrates air conditioners installed in various areas as examples of the equipment 10. For example, a message informing that the amount of loss (200,000 yen) that should be generated if the automatic control of the air conditioner 2 in the sales floor is cancelled is displayed by correlating the amount of loss with the air conditioner 2A in the sales floor. This leads to preventing the user from cancelling the automatic control.

Alternatively, in another case, it is assumed that multiple automatic control modes are defined according to the reduction of the energy consumption. In such a case, the display unit 52 displays the effect (which is herein the amount of loss to be generated by cancelling the automatic control) in the image for changing settings of the automatic control, as illustrated in FIG. 5, by correlating the effect representing the effect to be obtained by the automatic control with a list of target equipment for the automatic control.

Figure 5:
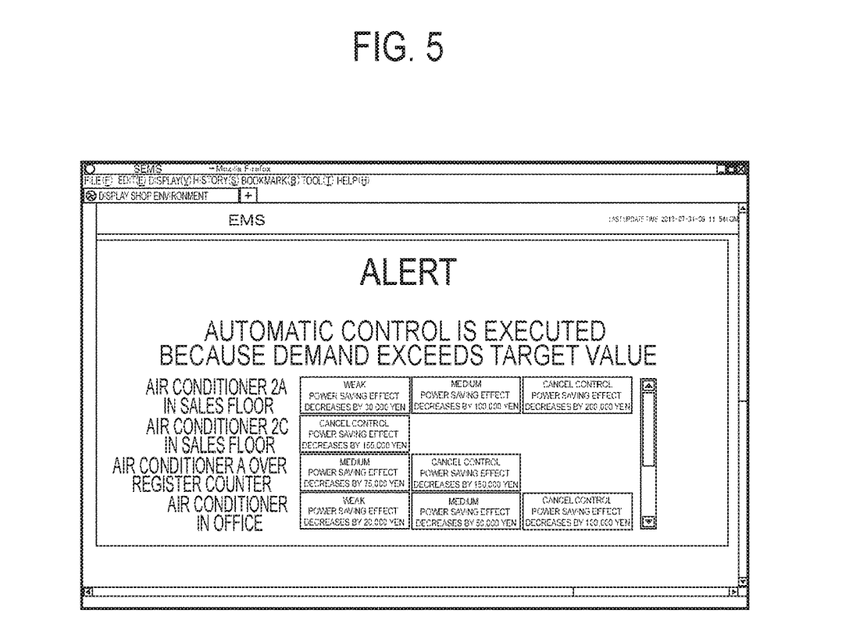
FIG. 5 illustrates an example image displayed on the display terminal 50 according to the first embodiment.

FIG. 5 illustrates air conditioners installed in various areas as examples of the equipment 10. For example, the sales floor air conditioner 2A has three levels of automatic control modes including "auto", "weak", and "medium" levels. If the current automatic control mode is changed from the "automatic" mode to the "weak" mode, it is displayed that the amount of loss (30,000 yen) should be generated as a result of correlating the amount of loss with the air conditioner sales floor air conditioner 2A. When the current automatic control mode is changed from "automatic" to "medium", it is displayed that a loss amount (100,000 yen) should be generated in connection with the sales floor air conditioner 2A. This allows the user to refrain from cancelling the automatic control.

In the image for changing the automatic control settings, the equipment 10 may be displayed in the order of providing larger or smaller effect from the automatic control.

The control unit 53 controls the display terminal 50. For example, the control unit 53 controls the image displayed on the display unit 52 in accordance with the information received from the server electric power management apparatus 40.

(Energy Management Method)

Figure 6:
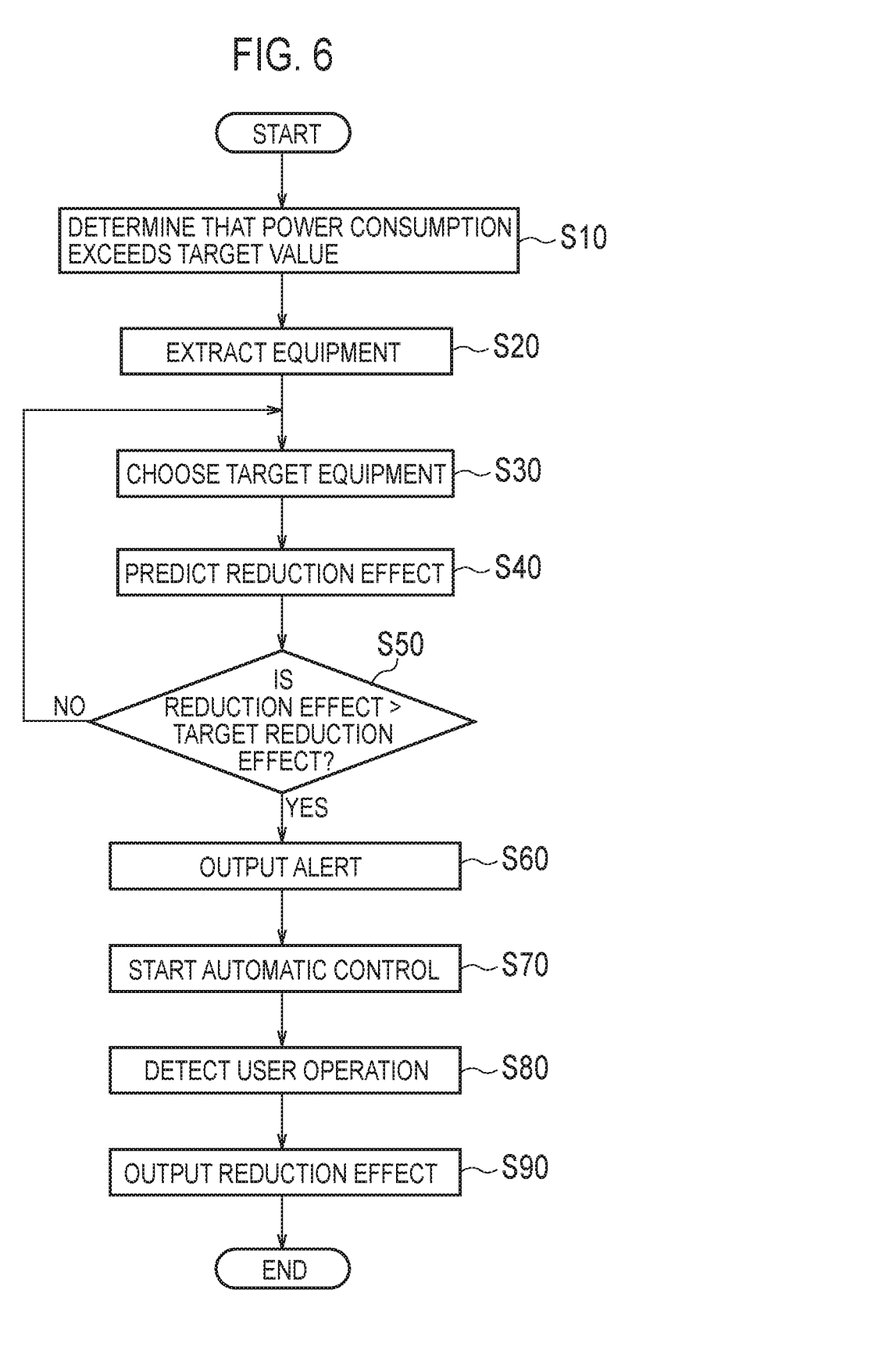
FIG. 6 illustrates an energy management method according to the first embodiment.

An energy management method according to the first embodiment is described below. FIG. 6 illustrates an energy management method according to the first embodiment. FIG. 6 is a flowchart illustrating the process performed by the server electric power management apparatus 40.

As illustrated in FIG. 6, the server electric power management apparatus 40 determines (predicts) in step S10 that the power consumption of the equipment 10 exceeds a predetermined threshold value (target value).

In step S20, the server electric power management apparatus 40 extracts automatically controllable equipment 10 according to the order of priority.

In step S30, the server electric power management apparatus 40 chooses the equipment 10 having the highest priority among unchosen pieces of equipment 10 of the automatically controllable equipment 10.

In step S40, the server electric power management apparatus 40 predicts the reduction effect to be provided from executing the automatic control on the equipment 10 chosen in step 30.

In step S50, the server electric power management apparatus 40 determines whether the reduction effect predicted in step S40 exceeds a target reduction effect. In other words, the server electric power management apparatus 40 determines whether the power consumption of the equipment 10 becomes smaller than the predetermined threshold value (target value) when the automatic control is executed on the equipment 10 having been chosen in step S30. If a determination result is YES, the server electric power management apparatus 40 proceeds to processing in step S60 accordingly. Meanwhile, if the determination result is NO, the server electric power management apparatus 40 returns to the processing of step S30.

In step S60, the server electric power management apparatus 40 outputs an alert message informing that the power consumption of the equipment 10 may exceed the predetermined threshold value (target value). Such an alert message is transmitted, for example, from the server electric power management apparatus 40 to the display terminal 50.

The server electric power management apparatus 40 may output the effect information indicating the effect obtained by the automatic control simultaneously with the alert message. For example, the effect information indicating the effect obtained by the automatic control is the information similar to that illustrated in FIG. 4 or 5.

In step S70, the server electric power management apparatus 40 starts automatic control of the equipment 10.

In step S80, the server electric power management apparatus 40 detects an operation (user operation) for cancelling the automatic control. The operation (user operation) for cancelling the automatic control is performed using the display terminal 50 as described above. Accordingly, information representing that the operation for cancelling the automatic control is performed is transmitted from the display terminal 50 to the server electric power management apparatus 40.

In step S90, the server electric power management apparatus 40 outputs the effect information indicating the effect obtained by the automatic control. The effect information obtained by automatic control is transmitted, for example, from the server electric power management apparatus 40 to the display terminal 50. The effect information obtained by automatic control is, for example, the information illustrated in FIG. 4 or 5.

As described above, the server electric power management apparatus 40 outputs the effect information indicating the effects obtained by automatic control operation in response to the operation for cancelling the automatic control. The user is allowed to cancel the automatic control, while motivation of the user to desire cancellation of the automatic control can be suppressed by seeing the effects to be obtained for reference. As a result of this, the energy saving and the QoL can both be achieved effectively.

Modification Example 1

A modification example 1 of the first embodiment is described below. In the following, what differs from the first embodiment is mainly described.

Figure 7:
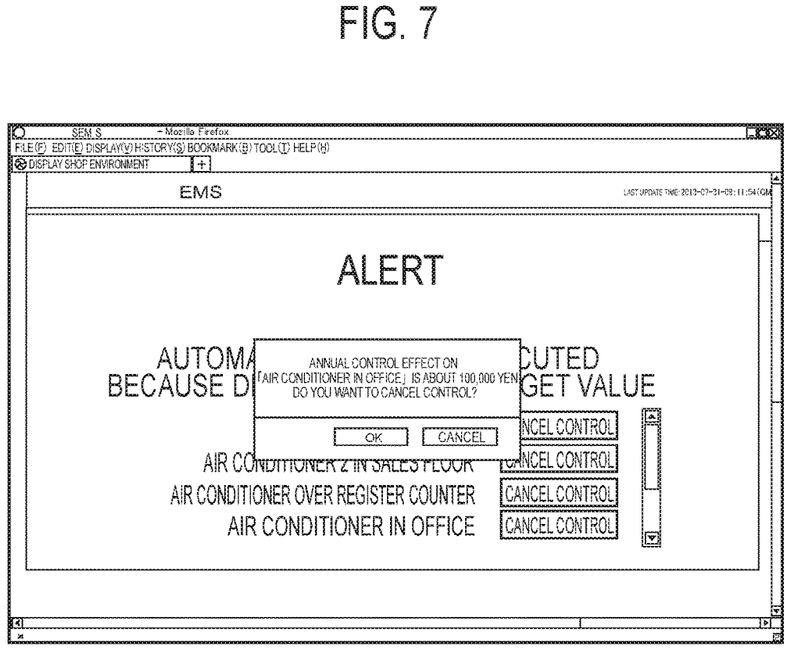
FIG. 7 illustrates an example image displayed on the display terminal 50 according to a modification example 1.

Specifically, although not mentioned in the first embodiment, the server electric power management apparatus 40 of the modification example 1 outputs pop-up information, as illustrated in FIG. 7, when the operation to cancel the automatic control is performed, in order to urge reconfirmation of cancellation of the automatic control.

The operation to cancel the automatic control, as used herein, is an operation by the user to click "cancel control" to cancel the automatic control in the screen illustrated in FIG. 4 using the display terminal 50. Alternatively, the operation to cancel the automatic control may be an operation by the user to click "weak" or "medium" in the screen illustrated in FIG. 4 using the display terminal 50 to cancel the current automatic control mode, or an operation by the user to click "cancel control" to cancel the automatic control.

Other Embodiments

Although the embodiment of the present invention has been described above, it should not be understood that the description and drawings that constitute part of the above disclosure limit the present invention. Apparently, persons who have ordinary skill in the art would devise various other embodiments, examples, and operational techniques from this disclosure.

The above-described embodiment has been illustrated as an example case of managing the plurality of local electric power management apparatuses 30 by the server electric power management apparatus 40. The embodiment, however, may not be limited to this case. For example, each local electric power management apparatus 30 may output the effect information indicating the effect obtained by the automatic control in response to the operation to cancel the automatic control in an autonomously and distributed manner.

The above-described embodiment outputs the effect information obtained by the automatic control as an image, but the embodiment is not limited thereto. For example, the effect information indicating the effect obtained by the automatic control may be provided as audio information.

Although it has not been mentioned in the above-described embodiment, the processing to control the accumulated value of the power consumption for a predetermined time period (e.g., 30 minutes) not to exceed the predetermined threshold value (target value) in each facility is performed for the following reason. Specifically, in Japan, a total electricity cost of a high voltage electrical power receiver, for example, is determined by a basic charge and an electricity volume charge. The basic charge is determined based on an accumulated value (peak electricity volume) of the power consumption, which has been measured for a predetermined time period (e.g., 30 minutes) in the past. The electricity volume charge is determined based on a sum of the electricity usage volume during a target time period for calculation. Specifically, the basic charge increases according to the peak electricity volume if the accumulated value (peak electric volume) of the power consumption for a predetermined time period (e.g., 30 minutes) exceeds the predetermined threshold value at least once. It is, therefore, preferable to control the accumulated value (peak electricity volume) of the power consumption for the predetermined time period (e.g., 30 minutes) so as not to exceed the predetermined threshold value (target value).

Under this background, the amount of loss to be generated caused by cancelling the automatic control may be calculated considering the increase of the basic charge.

The entire contents of Japanese Application No. 2013-266173 (filed on Dec. 24, 2013) has been incorporated into this specification by reference.

INDUSTRIAL APPLICABILITY

The embodiment provides an energy management system, an energy management apparatus, a terminal, and an energy management method capable of achieving both energy saving and QoL effectively.

The invention claimed is:

1. An energy management system that manages energy consumption of equipment, comprising:
   a controller that
      automatically controls the equipment so that the energy consumption by the equipment does not exceed a target value used for managing the equipment,
      receives a user operation to cancel the automatic control, and,
      in response to the user operation, generates and outputs a pop-up screen that comprises effect information which is information regarding an effect obtained by the automatic control.

2. The energy management system according to claim 1, wherein the pop-up screen associates the effect information with a list of target equipments to be automatically controlled in the automatic control.

3. The energy management system according to claim 2, wherein the effect information is information regarding an effect predicted to be obtained when the automatic control is not cancelled.

4. The energy management system according to claim 2, wherein the pop-up screen comprises an input for reconfirmation of cancellation of the automatic control.

5. The energy management system according to claim 2, wherein the effect information comprises an amount of money.

6. The energy management system according to claim 1, wherein the effect information is information regarding an effect predicted to be obtained when the automatic control is not cancelled.

7. The energy management system according to claim 6, wherein the pop-up screen comprises an input for reconfirmation of cancellation of the automatic control.

8. The energy management system according to claim 6, wherein the effect information comprises an amount of money.

9. The energy management system according to claim 1, wherein the automatic control includes a plurality of automatic control modes according to a reduction amount of energy consumption, and the effect information includes a plurality of effects obtained by each of the automatic control modes.

10. The energy management system according to claim 9, wherein the pop-up screen comprises an input for reconfirmation of cancellation of the automatic control.

11. The energy management system according to claim 9, wherein the effect information comprises an amount of money.

12. The energy management system according to claim 1, wherein the pop-up screen comprises an input for reconfirmation of cancellation of the automatic control.

13. The energy management system according to claim 12, wherein the effect information comprises an amount of money.

14. The energy management system according to claim 1, wherein the effect information comprises an amount of money.

15. An energy management apparatus for managing energy consumption of equipment, comprising:
   a controller that
      automatically controls the equipment so that the energy consumption by the equipment does not exceed a target value used for managing the equipment,
      receives a user operation to cancel the automatic control, and,
      in response to the user operation, generates and outputs a pop-up screen that comprises effect information which is information regarding an effect obtained by the automatic control.

16. A terminal used in an energy management system that automatically controls equipment so that energy consumption by the equipment does not exceed a target value used in managing the equipment, the terminal comprising:

a controller that
- receives a user operation to cancel the automatic control, and,
- in response to the user operation, displays a pop-up screen that comprises effect information which is information regarding an effect obtained by the automatic control.

17. An energy management method for managing energy consumption of equipment, comprising:
- automatically controlling the equipment so that the energy consumption by the equipment does not exceed a target value used for managing the equipment;
- receiving a user operation to cancel the automatic control; and,
- in response to the user operation, generating and outputting a pop-up screen that comprises effect information which is information regarding an effect obtained by the automatic control.

* * * * *